United States Patent [19]
Gandhi et al.

[11] 3,920,404
[45] Nov. 18, 1975

[54] CATALYST CONVERTER

[75] Inventors: Haren S. Gandhi, Dearborn Heights; Walter K. Heintz, Westland; Mordecai Shelef, Southfield, all of Mich.

[73] Assignee: Ford Motor Company, Dearborn, Mich.

[22] Filed: Sept. 11, 1974

[21] Appl. No.: 505,120

[52] U.S. Cl. ............................. 23/288 FC; 60/299
[51] Int. Cl.² .... B01J 8/02; B01J 35/04; F01N 3/15
[58] Field of Search ...... 23/288 F, 288 FB, 288 FC; 60/299, 301

[56] References Cited
UNITED STATES PATENTS

| | | | |
|---|---|---|---|
| 3,255,123 | 6/1966 | Haensel | 23/288 FC UX |
| 3,362,783 | 1/1968 | Leak | 23/288 FC X |
| 3,397,154 | 8/1968 | Talsma | 23/288 FB UX |
| 3,449,086 | 6/1969 | Innes | 23/288 F |
| 3,597,165 | 8/1971 | Keith et al. | 23/288 FC |
| 3,695,851 | 10/1972 | Perga | 23/288 F |
| 3,755,534 | 8/1973 | Graham | 60/299 |
| 3,798,006 | 3/1974 | Balluff | 23/288 FC |
| 3,854,888 | 12/1974 | Frietzsche et al. | 23/288 FC |

FOREIGN PATENTS OR APPLICATIONS

| | | | |
|---|---|---|---|
| 1,443,886 | 5/1966 | France | 23/288 FC |

*Primary Examiner*—Barry S. Richman
*Assistant Examiner*—Michael S. Marcus
*Attorney, Agent, or Firm*—William E. Johnson; Keith L. Zerschling

[57] ABSTRACT

A catalyst converter of the type employing a radial flow catalyst substrate. First and second enclosing can sections define an interior volume sufficiently large to have the radial flow catalyst substrate supported therewithin. Structure is provided for blocking one end of the radial flow catalyst substrate and additional structure is provided for mounting the blocking structure in contact with one end of the catalyst substrate. Support and sealing structures are provided at opposite ends of the enclosed catalyst substrate in order to resiliently cushion the substrate. The structure permits exhaust gases to flow into the interior volume of the catalyst substrate, radially through the substrate and then out to an exhaust pipe. The substrate has catalytically active material thereon for eliminating undesirable components of the gas stream passing through the converter.

2 Claims, 4 Drawing Figures

CATALYST CONVERTER

BACKGROUND OF THE INVENTION

In recent years catalytic converters have been proposed as devices for use in treating the exhaust gases from an internal combustion engine. Two principal approaches to forming such a catalytic converter have been taken so far. One form is the so-called pelletized catalytic converter and the other form is the monolith converter.

In the pelletized catalytic converter, a plurality of pellets coated with a catalytically active material are confined within an enclosure. Exhaust gases are admitted to the enclosure and passed through the voids and spaces between the pellets in order to be treated. The so treated gases are then delivered to an exhaust pipe.

In the monolith type of treatment, the catalytically active material is deposited on a substrate having a plurality of axially directed passageways. The gases to be treated flow along the axial passageways for treatment purposes.

This patent application teaches a catalyst converter in which the catalytically active material is deposited on a catalyst substrate formed as a cylindrical body open at both ends thereof. The exhaust gases are delivered to the internal volume of the substrate and flow radially therethrough for treatment purposes. Such radial converters can be made in a weaving operation which produces a substrate having a high surface area to volume ratio. This high ratio permits the direct deposition of the catalytically active material on the substrate without the use of an intermediate high surface area washcoat being deposited thereon.

SUMMARY OF THE INVENTION

This invention relates to a catalyst converter and, more particularly, to a catalyst converter of the type employing a radial flow catalyst substrate therewithin.

The device of this invention supports a radial flow catalyst substrate formed as a cylindrical body open at both ends thereof within an enclosure so that catalytically active material on the substrate may be used in the treatment of exhaust gases flowing therethrough. The device includes a first can section of generally cylindrical design having (a) a large open end portion having a diameter greater than the catalyst substrate, (b) a small open end portion having a diameter about the diameter of an exhaust pipe from an engine, and (c) an intermediate portion interconnecting the other portions and providing internal surfaces for locating a first end of the catalyst substrate within the large end portion. A second can section of generally cylindrical design is also provided which has (a) a large open end portion providing internal surfaces therewithin and (b) a small open end portion connectable to an exhaust pipe. The large end portion of the second can section abuts and is connected to the large open end portion of the first can section thereby to define an enclosure for the catalyst substrate.

Mounting structure is provided which engages the internal surfaces of the large open end portion of the second can section for locating a second end of the catalyst substrate within the enclosure. Blocking structure is mounted on the mounting structure for blocking the second end of the catalyst substrate so that gases may not flow through the open end thereof.

Support and seal structures are located between (a) the first end of the catalyst substrate and the internal surfaces of the intermediate portion of the first can section and (b) the second end of the catalyst substrate and the blocking structure. The support and seal structure provides both a resilient cushioning structure between the catalyst substrate and its supporting structure and a seal which forces exhaust gases to flow in the proper direction through the catalyst substrate. The proper direction of flow is through the small open end of the first can section into the central portion of the catalyst substrate, radially through the catalyst substrate, and then through the small open end portion of the second can section to an exhaust pipe.

DESCRIPTION OF THE PREFERRED EMBODIMENT

Construction

Figure 1:
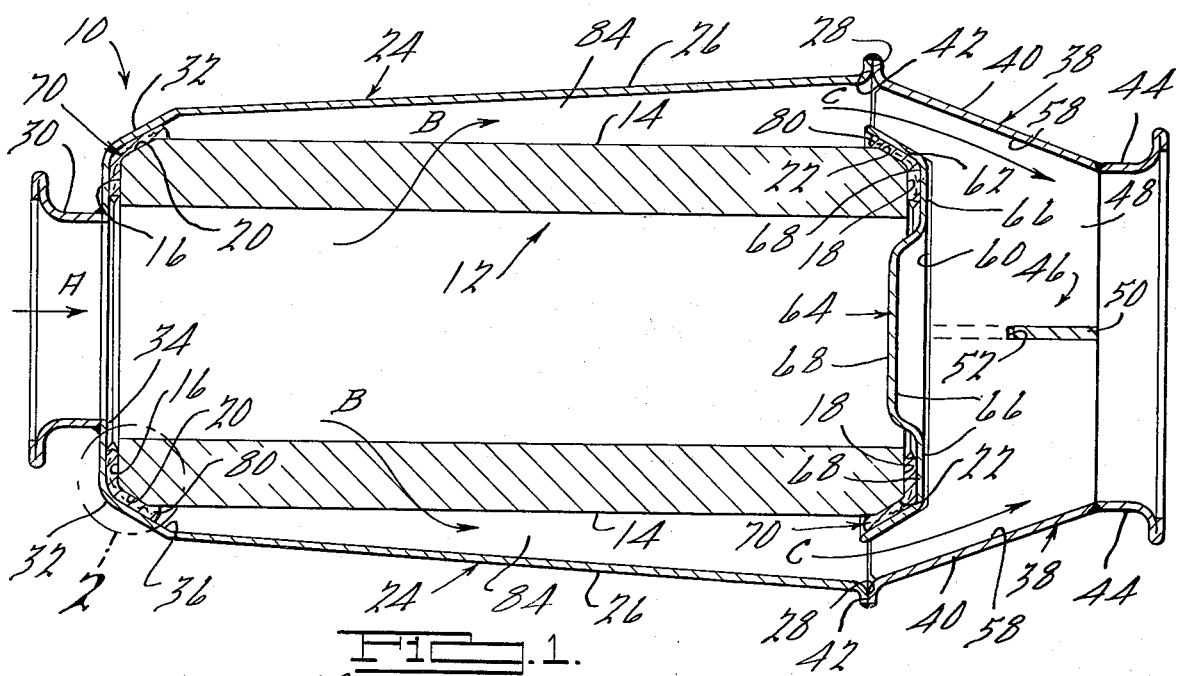
FIG. 1 is a side elevational view, in cross section, of a catalyst converter formed in accordance with the teachings of this invention.

In FIG. 1 there is seen a catalyst converter, generally indicated by the numeral 10, constructed in accordance with the teachings of this invention. A radial flow catalyst substrate, generally identified by the numeral 12, is contained in the converter. The catalyst substrate is formed as a cylindrical body open at both ends. The substrate has an outer circumferential surface 14, annular surfaces 16 and 18 at opposite ends thereof and inclined surfaces 20 and 22 interconnecting the outer circumferential surface 14 respectively with annular surfaces 16 and 18.

A first can section, generally identified by the numeral 24, is provided. The first can section has a large open end portion 26 having a diameter greater than the diameter of the catalyst substrate 12. The large open end portion also has an annular mating surface 28.

The first can section 24 has a small end portion 30. This small end portion is connectable in a normal manner to an exhaust pipe from an internal combustion engine. In such a manner, gases from the engine are received therewithin for processing in the converter. Gases generally move in the direction of arrow A of FIG. 1.

Figure 2:
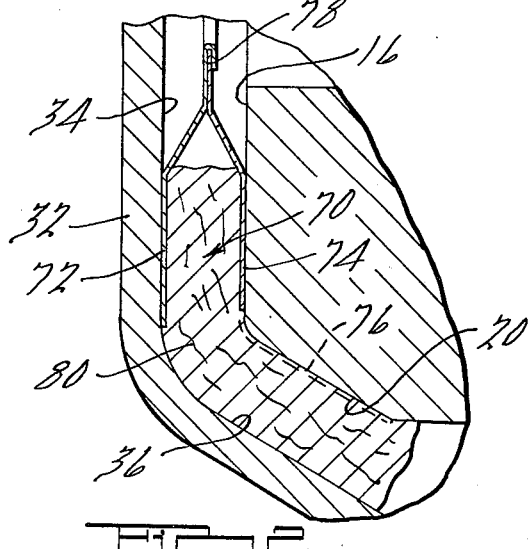
FIG. 2 is an exploded view of an area indicated in FIG. 1.

The first can section 24 also has an intermediate portion 32 the general shape of which is shown best in FIG. 2. The intermediate portion interconnects the large open end portion 26 with the small end portion 30 of the first can section. The intermediate portion provides an annular locating surface 34 and an inclined locating surface 36. These surfaces are used in locating the annular surface 16 and the inclined surface 20 of the catalyst substrate 12 within the first can section 24.

A second can section, generally identified by the numeral 38, is also provided. This second can section has a large open end portion 40 having a second mating surface 42 thereon. The second mating surface is bonded to the first mating surface 28 of the first can section 24 in order to provide a completely sealed catalyst converter 10. The bonding of these two surfaces may be in any manner so long as an air tight seal is provided. The second can section also has a small open end portion 44 which is connectable to an exhaust pipe for delivering the exhaust gases treated in the converter to the rear end of a motor vehicle. The connection to the exhaust pipe is of standard construction and thus is not shown.

Figure 4:
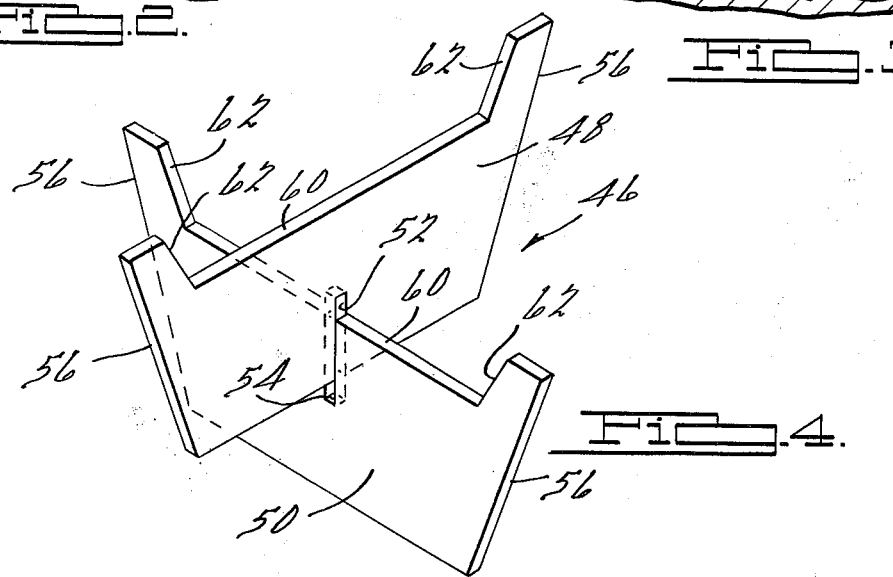
FIG. 4 is a perspective view of a portion of the apparatus used in forming the converter of this invention.

The large open end portion 40 of the second can section 38 contains a support member generally identified by the numeral 46 and shown best in FIG. 4. The support member is formed of two cross members 48 and 50 respectively. Members 48 and 50 are slotted respectively at 52 and 54 so that they may be fitted together to provide radial extending arms at 90° intervals. Each of the radially extending arms of the cross members terminate at free ends 56 for engaging an internal surface 58 of the large open end portion 40 of the second can section 38. The cross members of the support member 46 also define radially extending surfaces 60 and inclined surfaces 62 which are used for locating and supporting other structure to be described hereinbelow.

A blocking member, identified generally by the numeral 64 and shown only in FIG. 1 of the drawing, is provided for the purposes of closing the end of the catalyst substrate 12 which is confined within the catalyst converter 10 near the second can section 38 thereof. The blocking member 64 is designed to block the open end of the substrate so that exhaust gases entering the converter in the direction of arrow A flow within the interior volume of the substrate and then are forced to flow radially outwardly through the substrate in the direction of arrow B for processing on the catalyst material contained on the substrate. The blocking member 64 has a first surface 66 received on the radially extending surfaces 60 and inclined surfaces 62 of the support member 46 for locating and supporting the blocking member in a proper position. The blocking member also has a second surface 68 which provides a general locating surface for the annular surface 18 and inclined surface 22 of the catalyst substrate 12.

Figure 3:
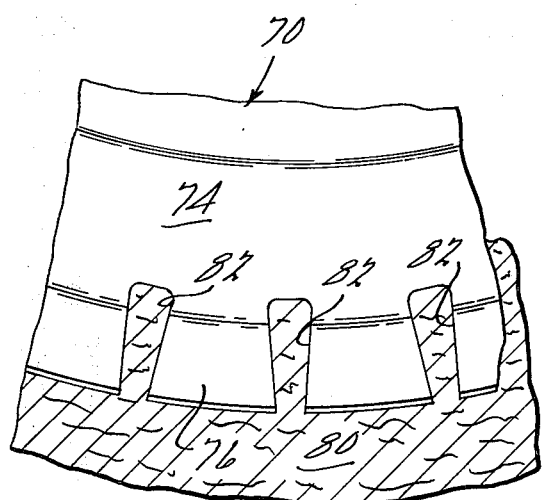
FIG. 3 is a front elevation view of the support and seal structure used in the converter.

At each end of the catalyst substrate 12 there is provided an identical support and seal member generally identified by the numeral 70 and best seen in FIGS. 2 and 3. The support and seal member 70 has a first annular ring 72 and a second annular ring 74 having an inclined annular portion 76 at its outer periphery. The first annular ring and the second annular ring are crimped to one another at 78, FIG. 2 only, but are generally spaced from one another over their lengths to provide an opening therebetween into which a woven wire mesh 80 is inserted. This wire mesh is of the knitted wire mesh type.

The inclined portions 76 of the second annular ring 74 has a plurality of slots 82 therein, see FIG. 3. The wire mesh 80 moves up into the slots and thus becomes anchored and will not move relative to the annular rings 72 and 74. The wire mesh 80 of course provides the resilient mounting of the catalyst substrate 12 within the catalyst converter 10.

The support and seal members are located at opposite ends of the catalyst substrate 12. As viewed in FIG. 1, one of the supporting and seal members 70 is located so that it engages annular locating surface 34 and inclined locating surface 36 of the intermediate portion 32 of the first can section 24. The support and seal member also locates and positions the annular surface 16 and inclined surface 20 of the catalyst substrate 12. In this manner an air tight seal is provided at the left end of the catalyst substrate 12 forcing any gases which enter through the small end portion 30 into the internal volume of the catalyst substrate.

At the right end of the catalyst substrate 12, as shown in FIG. 1, the annular surface 18 and inclined surface 22 of the substrate are supported and located against the surface 68 of the blocking member 64 by a support and seal member 70. The seal once again is air tight whereby the open end of the catalyst substrate is blocked and gases entering the interior volume of the substrate are forced to flow radially outwardly through the substrate into a chamber 84 defined between the outer circumferential surface 14 of the substrate and the interior of the large open end portion 26 of the first can section 24.

Operation

In order to use the catalyst converter 10 of this invention, a catalytically active material is applied in a routine manner to the catalyst substrate 12. Exhaust gases developed by burning fuel in an internal combustion engine enter the converter 10 through the small end portion 30 of the first can section 24 in the direction of arrow A of FIG. 1. The gases are passed into the interior volume of catalyst substrate 12, radially outwardly through the substrate as indicated by arrow B into chamber 84, along the length of the chamber 84 and then through the support member 46 as indicated by arrow C to the small open end portion 44 of the second can section 38 for normal exhausting. The structure of this invention provides a simple and reliable construction for sealing a radial flow type catalyst substrate within an enclosed volume so that the substrate may be used in eliminating undesirable components of an exhaust gas stream.

In view of the teachings of this specification, those skilled in the art will make improvements to the disclosed structure which fall within the true spirit and scope of this invention. It is intended that all such improvements be included within the scope of the appended claims.

We claim:
1. A catalytic converter comprising:
 a radial flow catalyst substrate formed as a cylindrical body open at both ends and having an outer circumferential surface, an annular surface at opposite open ends thereof and an angularly inclined surface at each end interconnecting the cylindrical surface with each of the annular surfaces;
 a first can section having (a) an elongated, generally cylindrical portion having a diameter greater than the diameter of the catalyst substrate and a length slightly less than the length of the catalyst substrate, said elongated, generally cylindrical portion being open at both ends, one of said ends thereon having a first mating surface, (b) a small end portion connectable to an exhaust pipe from an engine, and (c) an intermediate portion interconnecting said small end portion with the other open end of said elongated, generally cylindrical portion and providing internal locating surfaces for locating the annular and the inclined surfaces located at a first end of the catalyst substrate;
 a second can section having (a) a generally cylindrical portion providing internal surfaces therewithin, and being open at both ends, one of said ends having a second mating surface which is bonded to the first mating surface of said elongated, generally cylindrical portion of the first can section whereby the first and second can sections form an enclosure for the catalyst substrate, and (b) a small open end portion connectable to an exhaust pipe said small end portion being connected to said other end of said generally cylindrical portion of the second can section;

a support member including a plurality of radially extending arms terminating at free ends having surfaces for engaging the internal surfaces of the cylindrical portion of the second can section to locate the support member within the cylindrical portion of the second can section, said support member also defining radially directed locating surfaces on the extending arms thereof;

a blocking member having a first surface received in the locating surfaces of the support member and a second surface providing locating surfaces for locating the annular and the inclined surfaces of a second end of the catalyst substrate; and support and seal members located between (a) the angularly inclined surface at the first end of the catalyst substrate and the intermediate portion of the first can section and (b) the angularly inclined surface at the second end of the catalyst substrate and said blocking member, each of the support and seal members being identical in construction and comprising (i) a first annular ring, (ii) a second annular ring, both said first and second annular rings having an inclined annular portion at their inner portion said first and second annular rings being coupled at their inner portion thereof, the annular rings being spaced from one another over most of their radial extension, and (iii) a wire mesh interposed between the first and second annular rings, the inclined annular portion of the second annular ring having slots therein within which portions of the wire mesh may be received to anchor the mesh in the support and seal member.

2. The catalyst converter of claim 1 wherein said support member is formed from two individual members having opposed slots in the central portion thereof permitting them to be received one upon the other to establish radially extending arms perpendicular to one another.

* * * * *